United States Patent
Shelke et al.

(10) Patent No.: US 11,645,158 B2
(45) Date of Patent: May 9, 2023

(54) AUTOMATED ROLLBACK IN VIRTUALIZED COMPUTING ENVIRONMENTS

(71) Applicant: VMware, Inc., Palo Alto, CA (US)

(72) Inventors: Prashant Shelke, Pune (IN); Avinash Bhattarmakki, Pune (IN); Ashish Agrawal, Pune (IN); Makarand Gawade, Pune (IN); Yogesh Vhora, Pune (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/349,935

(22) Filed: Jun. 17, 2021

(65) Prior Publication Data
US 2022/0405171 A1 Dec. 22, 2022

(51) Int. Cl.
*G06F 11/14* (2006.01)
*G06F 8/65* (2018.01)
*G06F 9/455* (2018.01)

(52) U.S. Cl.
CPC .......... *G06F 11/1433* (2013.01); *G06F 8/65* (2013.01); *G06F 9/45558* (2013.01); *G06F 2009/4557* (2013.01); *G06F 2201/84* (2013.01)

(58) Field of Classification Search
CPC .... G06F 11/1433; G06F 8/65; G06F 9/45558; G06F 2009/4557; G06F 2201/84
See application file for complete search history.

(56) References Cited

U.S. PATENT DOCUMENTS

| | | | |
|---|---|---|---|
| 7,080,371 B1* | 7/2006 | Arnaiz | G06F 8/65 717/170 |
| 10,545,750 B2 | 1/2020 | Pande et al. | |
| 2010/0030823 A1 | 2/2010 | Meller et al. | |
| 2012/0117555 A1* | 5/2012 | Banerjee | G06F 8/65 717/168 |
| 2012/0210312 A1 | 8/2012 | Ma et al. | |
| 2014/0122329 A1* | 5/2014 | Naggar | G06Q 20/3552 705/41 |
| 2016/0092196 A1* | 3/2016 | Kuchibhotla | G06F 8/65 717/170 |
| 2019/0034256 A1* | 1/2019 | Fox | G06F 8/654 |
| 2019/0138294 A1* | 5/2019 | Smith | H04L 9/0894 |
| 2019/0171435 A1* | 6/2019 | Pande | H04L 43/10 |
| 2019/0227882 A1 | 7/2019 | Shelke et al. | |
| 2020/0225931 A1* | 7/2020 | Nan | G06F 8/65 |

OTHER PUBLICATIONS

Non-Published Commonly Owned U.S. Patent Application, "Data and Configuration Integrity Checking Post-Rollback Using Backups in Virtualized Computing Environments", Filed on Jun. 17, 2021, VMware, Inc.

* cited by examiner

*Primary Examiner* — Phillip H Nguyen
(74) *Attorney, Agent, or Firm* — Su IP Consulting

(57) ABSTRACT

A rollback can be performed after completing an upgrade to components of a virtualized computing environment. When the upgrade is performed, an upgrade bundle having rollback scripts is provided to edges, hosts, and managers in the virtualized computing environment that are to be upgraded. When a rollback is to be performed, the rollback scripts are executed, and the components are rolled back in a reverse order relative to their upgrade order. Data and configuration checking are performed to validate the results of the rollback.

21 Claims, 12 Drawing Sheets

1100

1102 1104 1106 1108 1110

| File Name | Matched Lines | Old Unmatched Lines | New Unmatched Lines | Generic Comments |
|---|---|---|---|---|
| Inventory.json | 100 | 15 | 21 | Seems new data |
| Node backup | 25 | 0 | 0 | Looks good |
| Cluster backup | 37 | 0 | 15 | Seems new features |
| Config CLI | 2019 | 1009 | 0 | Seems data removed |
| Backup.txt | 0 | 0 | 57 | Seems new features |

1112

AUTOMATED ROLLBACK IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual appliances in a virtualized computing environment. For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software defined networking, benefits similar to server virtualization may be derived for networking services. For example, logical overlay networks may include various components that are decoupled from the underlying physical network infrastructure, and therefore may be provisioned, changed, stored, deleted and restored programmatically without having to reconfigure the underlying physical hardware.

In order to stay and remain competitive in the market, to provide new features, to comply with government requirements, to perform reporting and analytics, and for other reasons, technology upgrades to a logical overlay network are useful in enabling organizations to operate successfully. For example, many of the advanced features of a product become available only after an upgrade. Upgrades provide increased productivity, improved communication, improved efficiency, better security, enhancements, extra support, reduced cost, compatibility, reduced outages, better customer engagements, business growth, etc.

Nevertheless, in some situations, an upgrade may not provide the desired results. For instance, a bug or other technical issues may cause to the upgrade to malfunction or otherwise cause the upgraded components of a logical overlay network to not operate as intended. Hence, a rollback can be performed to return the logical overlay network to a state/configuration that existed prior to the upgrade, so that the upgrade can be debugged/modified to address issues and then re-deployed at some later time in the logical overlay network. However, existing techniques to perform a rollback are inefficient and/or deficient, especially in a logical overlay network with hundreds or thousands of components, where it can be challenging to effectively perform a rollback after an upgrade.

Figure 1:
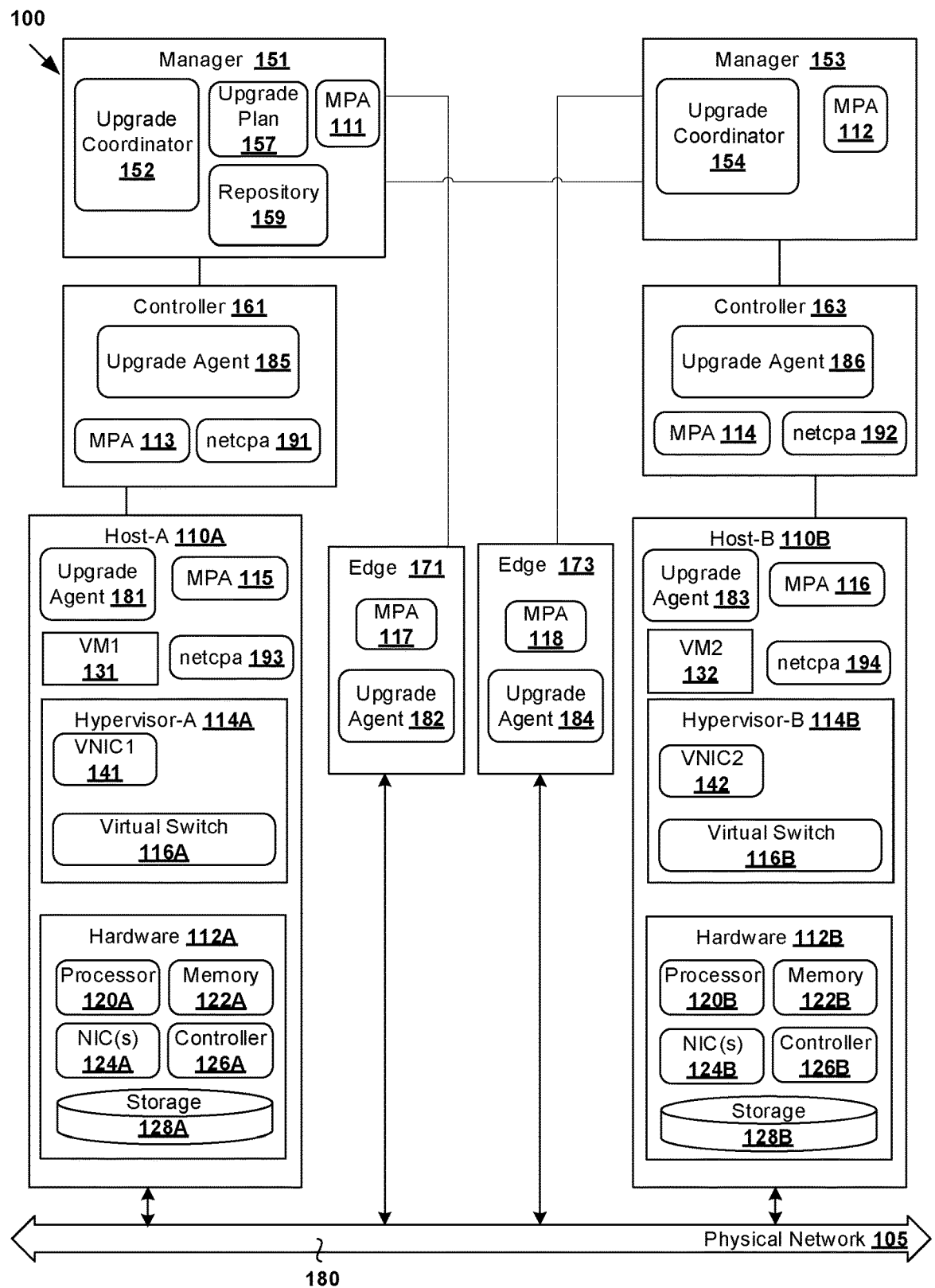
FIG. 1 is a schematic diagram illustrating an example virtualized computing environment in which an upgrade and a rollback from the upgrade may be implemented.

All of the foregoing are arranged in accordance with various embodiments of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

The embodiments disclosed herein are directed towards techniques to more effectively and efficiently perform a rollback in a logical overlay network (e.g., a virtual networking platform or other virtualized computing environment). The logical overlay network may include at least four components that are integrated together: a management plane (MP), central control plane (CCP), edge(s), and a data plane (DP). The DP may be comprised of hosts having a hypervisor that supports VMs and which may use various virtualization technologies. The CCP may be comprised of a cluster of controller nodes responsible for configuring networking flows in the hypervisors. The MP may be comprised of a cluster of management nodes which provides a management interface to an end user (such as a system administrator or other user). As will be further described below, the three planes (MP, CCP, and DP) may be implemented as a set of processes, modules, agents, and other elements residing on three types of nodes: managers and controllers, edges, and hosts.

According to some embodiments, the managers include an upgrade coordinator that is responsible for upgrading all the nodes in an automated and ordered manner, such as upgrade order of: edge→DP→(CCP and MP). The embodiments described herein provide a rollback capability for a logical overlay network that has been upgraded from source version to target version, such as a rollback performed in a reverse order of: (CCP and MP)→DP→edge.

According to an example workflow/process, an upgrade is performed in a logical overlay network having edges, hosts, and clusters (of managers and controllers), from a source version to a target version. The upgrade may be performed using an upgrade bundle that includes a rollback feature (e.g., rollback scripts). Then, when a user decides to initiate a rollback, such as due to the target version not meeting quality parameters and expectations and/or for other reason(s), the rollback scripts are executed to perform the rollback. Such a rollback is first performed for the MP and CCP nodes in a cluster from the target version to the source version; and then performed for the host nodes (in the DP) from the target version to the source version; and then performed for the edge nodes in a cluster from the target version to the source version.

According to some embodiments, data and configuration integrity checking may be performed, so as to verify/validate that the rollback from the upgraded version (e.g., the "to-version") has resulted in the pre-upgrade version (e.g., the "from-version") of data/configuration in the logical overlay network. The various components/elements, features, and operations associated with performing an upgrade, rollback, and data/configuration checking will be described next below with reference to the figures.

Computing Environment and Upgrade/Rollback Components

With reference first to FIG. 1, FIG. 1 is a schematic diagram illustrating an example virtualized computing environment 100 in which an upgrade and a rollback from the upgrade may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A and host-B 110B that are connected via physical network 105. Each host 110A/110B includes suitable hardware 112A/112B and virtualization software (e.g., hypervisor-A 114A and hypervisor-B 114B) to support virtual machines (e.g., VM1 131 and VM2 132). For example, host-A 110A supports VM1 131; and host-B 110B supports VM2 132. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B maintains a mapping between underlying hardware 112A/112B and virtual resources allocated to respective virtual machines 131-132. Hardware 112A/112B includes suitable physical components, such as central processing unit(s) or processor(s) 120A/120B; memory 122A/122B; physical network interface controllers 124A/124B; and storage disk(s) 128A/128B accessible via storage controller(s) 126A/126B, etc. To support guest operating systems and applications, virtual resources are allocated to the virtual machines. For example, corresponding to hardware 112A/112B, the virtual resources may include virtual CPU, virtual memory, virtual disk, virtual network interface controller (VNIC), etc. In the example in FIG. 1, VM1 131 and VM2 132 are associated with respective VNIC1 141 and VNIC2 142. Although one-to-one relationships are shown, one virtual machine may be associated with multiple VNICs (each VNIC having its own network address) in practice.

Hypervisor 114A/114B implements virtual switch 116A/116B to forward egress packets (i.e., outgoing or outbound) from, and ingress packets (i.e., incoming or inbound) to, the virtual machines. As used herein, the term "packet" may refer generally to a group of bits that can be transported together from a source to a destination, such as segment, frame, message, datagram, etc. Also, the term "layer 2" may refer generally to a media access control (MAC) layer; and "layer 3" to a network or internet protocol (IP) layer in the open system interconnection (OSI) model, although the concepts described herein may be used with other networking models. Physical network 105 may include any suitable number of interconnected physical network devices, such as routers, switches, etc.

Managers 151, 153, controllers 161, 163 and edges 171, 173 are components that facilitate implementation of software defined (e.g., logical overlay) networks in virtualized computing environment 100. Through network virtualization, logical overlay networks may be provisioned, changed, stored, deleted and restored programmatically without having to reconfigure the underlying physical hardware. A logical overlay network may be formed using any suitable protocol, such as virtual local area network (VLAN), virtual eXtensible local area network (VXLAN), stateless transport tunneling (STT), generic network virtualization encapsulation (GENEVE), etc.

In some embodiments, an example logical overlay network may be implemented with an architecture having been built-in separation of a management plane (MP), a control plane (CP), and a data plane (DP). The management plane provides secure concurrent entry points to the example logical overlay network via a graphical user interface. The control plane is configured to track of the real-time virtual networking and security state of the logical overlay network. The data plane implements a number of capabilities to improve the performance and resiliency of the example logical overlay network. In some embodiments, the management plane includes managers 151 and 153, the control plane includes controllers 161 and 163, and the data plane includes hosts 110A and 110B and edges 171 and 173.

Managers 151 and 153 may serve as an entry point for representational state transfer (REST) application programming interface (API) for NSX or other virtualization platform, which facilitates automated deployment and management of components in the example logical overlay network. Some example components in the example logical overlay network include, but are not limited to, controllers 161 and 163, edges 171 and 173, and hosts 110A and 110B. One example of managers 151 and 153 is the NSX manager component of VMware NSX® (available from VMware, Inc.) that operates on a management plane. Managers 151/153 may be implemented using physical machine(s), virtual machine(s), or both. Managers 151 and 153 may run management plane agent (MPA) 111 and 112, respectively. MPA 111 and 112 are configured to persist the state of virtualized computing environment 100 and communicate non-flow-controlling messages such as configurations, statistics, status and real time data among MPA 113 and 114 on controller 161 and 163, MPA 115 and 116 on hosts 110A and 110B, and MPA 117 and 118 on edges 171 and 173.

Controllers 161 and 163 may be members of a controller cluster (not shown for simplicity) that is configurable using managers 151 and 153, respectively. One example of controllers 161 and 163 is the NSX controller component of VMware NSX® that operates on a central control plane (CCP). Controllers 161/163 may be implemented using physical machine(s), virtual machine(s), or both. Controllers 161 and 163 may run control plane agent (netcpa) 191 and 192 to monitor the communications between controllers 161/163 and hosts 110A/110B. Similarly, hosts 110A and 110B also run netcpa 193 and 194 to validate the connections from hosts 110A/110B to controllers 161/163.

Edges 171 and 173 are configured to provide network edge security and gateway services in the example logical overlay network. One example of edge 171 and 173 is the NSX Edge component of VMware NSX® that operates on a data plane. In some embodiments, edges 171 and 173 may provide logical services in the example logical overlay network. Some example logical services include, but not limited to, routing, network address translation, firewall, load balancing, L2 and L3 virtual private networks, and dynamic host configuration protocol (DHCP), domain name system (DNS), and internet protocol (IP) address management.

Components (managers 151/153, controllers 161/163, edges 171/173, and hosts 110A/110B) in the logical overlay network may be upgraded. According to some techniques, during the upgrade, an administrator uploads an upgrade bundle (UB) to manager 151, and triggers and monitors the upgrade progress of hosts 110A/110B, edges 171/173, controllers 161/163, and managers 151/153. With such techniques, only one single upgrade coordinator (e.g., upgrade coordinator 152) is used for the upgrades of all components in virtualized computing environment 100. It becomes challenging for the upgrade coordinator 152 in a multi-tenant data center with hundreds or thousands of clusters of appliances and workload hosts.

Therefore in some embodiments (such as disclosed in U.S. Pat. No. 10,545,750, entitled "DISTRIBUTED UPGRADE IN VIRTUALIZED COMPUTING ENVIRONMENTS," filed on Dec. 6, 2017, and incorporated herein by reference), the manager 151 is configured as a master manager. In some embodiments, master manager 151 includes repository 159 to which an upgrade bundle (UB) is uploaded to master manager 151. Other managers (e.g., manager 153) in the example overlay logical network may be configured as slave managers which are coordinated by master manager 151.

In some embodiments, master manager 151 runs upgrade coordinator 152 which may be a self-contained web application that orchestrates the upgrade process of different components in the example overlay logical network. In some embodiments, master manager 151 is configured to get a list of all components in virtualized computing environment 100. Based on the list, upgrade coordinator 152 is configured to generate distributed upgrade plan 157 for all components (e.g., manager 151/153, controller 161/163, edge 171/173, and host 110A/110B). In some embodiments, distributed upgrade plan 157 lists out the tasks and the orders to carry out. Upgrade coordinator 152 may distribute tasks in upgrade plan 157 to upgrade coordinator 154 on slave manager 153. In some embodiments, hosts 110A/110B, edges 171/173, controllers 161/163, and managers 151/153 are upgraded in sequence.

More specifically, in some embodiments, according to upgrade plan 157, upgrade coordinator 152 may distribute upgrade tasks of hosts 110A/110B to other upgrade coordinators (e.g., upgrade coordinator 154) that reside on other managers (e.g., manager 153) to complete the upgrades of hosts 110A/110B. After or before hosts 110A/110B are upgraded, upgrade coordinator 152 may distribute upgrade tasks of edges 171/173 to upgrade coordinators 152/154 to complete the upgrades of edges 171/173. Similarly, after edges 171/173 are upgraded, upgrade coordinator 152 may distribute upgrade tasks of controllers 161/163 to upgrade coordinators 152/154 to complete the upgrades of controllers 161/163. Finally, after controllers 161/163 are upgraded, upgrade coordinator 152 may distribute upgrade tasks of managers 151/153 to upgrade coordinators 152/154 to complete the upgrades of managers 151/153. Thus, this upgrade sequence may be represented as: edge→DP→(CCP and MP). The MP and CCP may be used interchangeably/synonymously or may be the same plane in some embodiments.

In some embodiments, upgrade coordinators 152 and 154 are configured to work with upgrade agents 181/183 to upgrade hosts 110A/110B, upgrade agents 182/184 to upgrade edges 171/173, and upgrade agents 185/186 to upgrade controllers 161/163. In some embodiments, upgrade agents 181-186 are configured to receive commands from upgrade coordinators 152 and 154 to download the upgrade bundle from repository 159, process the upgrade bundle and upgrade hosts 110A/110B, edges 171/173, and controllers 161/163 according to the upgrade bundle.

Figure 2:
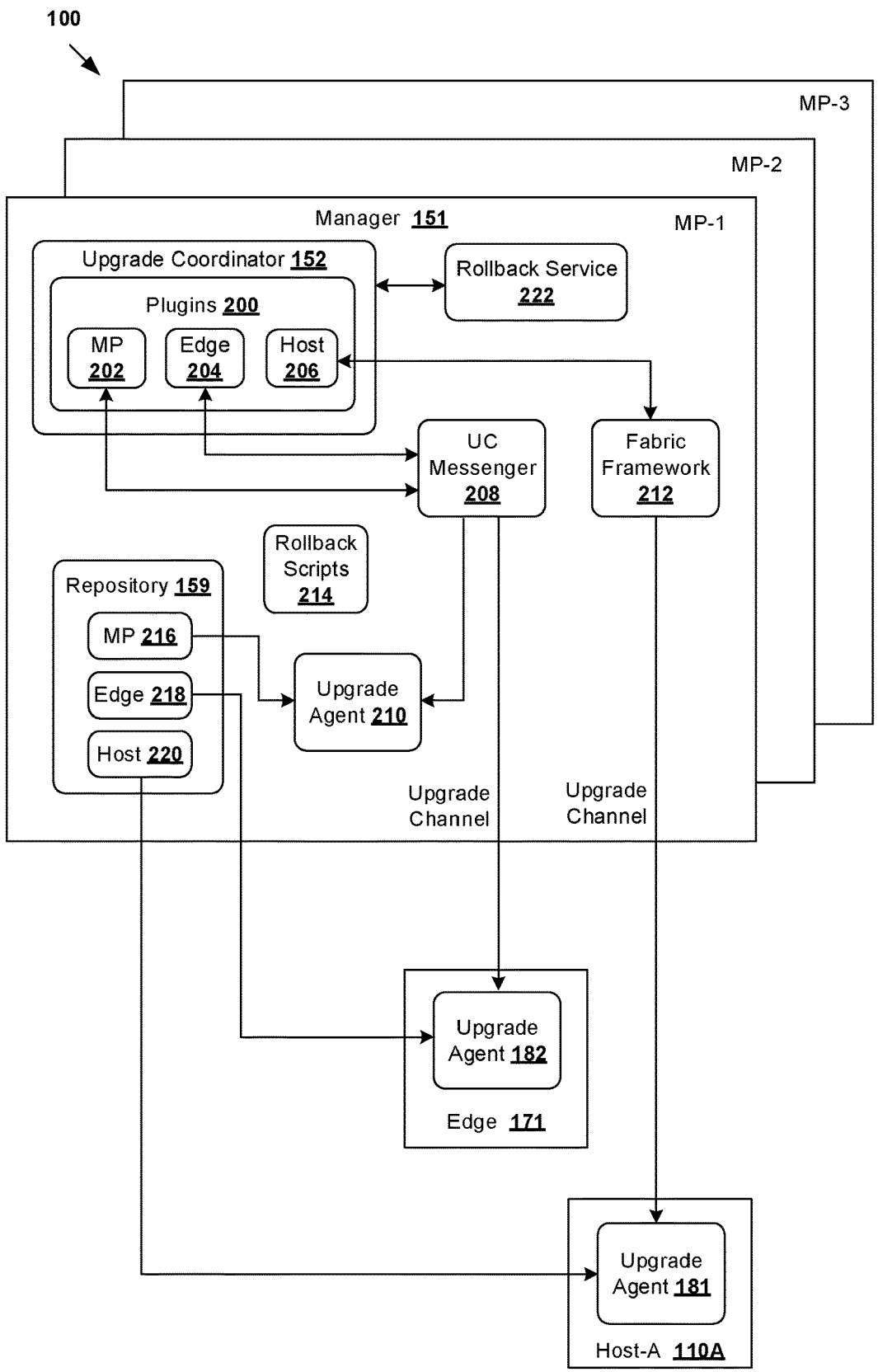
FIG. 2 is a schematic diagram illustrating further details of example upgrade and rollback components in the virtualized computing environment of FIG. 1.

FIG. 2 is a schematic diagram illustrating further details of example upgrade and rollback components in the virtualized computing environment 100 of FIG. 1, in accordance with some embodiments. In FIG. 2, the manager 151 is shown as residing on a management plane MP-1, and other managers (e.g., manager 153) may reside on management planes MP-2, MP-3, etc. For the sake of simplicity of illustration and explanation, only the single edge 171 and single host-A 110A are shown in FIG. 2.

The manager 151 includes the upgrade coordinator 152 that uses a plugin framework 200. The plugin framework 200 inside the upgrade coordinator 152 includes management plane plugins 202, edge plugins 204, and host plugins 206, which provide a common interface for each vertical (e.g., manager, edge, and host) to enable execution of its respective upgrade. These plugins 202-206 may also be used for rollback operations.

The management plane plugin 202 interacts, via an upgrade coordinator messenger 208, with an upgrade agent 210 that is present locally on the node (manager 151) for purposes of performing upgrade operations on the manager 151. The edge plugin 204 interacts, via the upgrade coordinator messenger 208, with the upgrade agent 182 that is present locally on the node (edge 171) for purposes of performing upgrade operations on the edge 171 through an upgrade channel. The host (DP) plugin 206 interacts, via a fabric framework 210 inside the management plane MP-1, with the upgrade agent 181 that is present locally on the host-A 110A for purposes of performing upgrade operations on the host-A 110A also through an upgrade channel. Such upgrade channels may also be used for rollbacks.

The plugin framework 200 serves as an interface for the information that is related to upgrade and rollback operations. According to some embodiments, the plugin framework 200 does not serve as a source of fetching non-upgrade or non-rollback related information of nodes, such as information regarding connectivity of hosts to MP-1, operating system (OS) version etc. Rather, the update coordinator 152 may fetch such information from the management plane.

The management plane MP-1 may include rollback scripts 214. The rollback scripts 212 of some embodiments may reside in the repository 159 as part of one or more upgrade bundles (such as a MP upgrade bundle 216, edge upgrade bundle 218, and host upgrade bundle 220). In other implementations, the rollback scripts 214 may reside elsewhere in the management plane MP-1. According to various embodiments, the rollback scripts 214 become part of an appliance (e.g., host, edge, manager, or controller) and are not deleted (e.g., remain) after the upgrade process so as to be available if a rollback is needed in the future.

A rollback operation may typically be performed after a management plane has successfully performed an upgrade (e.g., to the "to-version"), but due to some reason, the user wishes to revert back to the previous version (e.g., back to the "from-version). In accordance with some embodiments, the rollback is performed in a reverse order relative to the order of the upgrade operation. Thus, if the upgrade operation was performed in the order of edge→DP→(CCP and MP), then the rollback is performed in the reverse order of MP(MP+CCP)→DP→edge.

For rollbacks, a rollback service 222 is created on the management node MP-1 and interacts with the upgrade coordinator 152. This rollback service 222 may be disabled by default and enabled for rollback purposes. Further details of the rollback operations, including those involving the rollback service 222, will be provided later below with respect to FIGS. 7-9.

Figure 3:
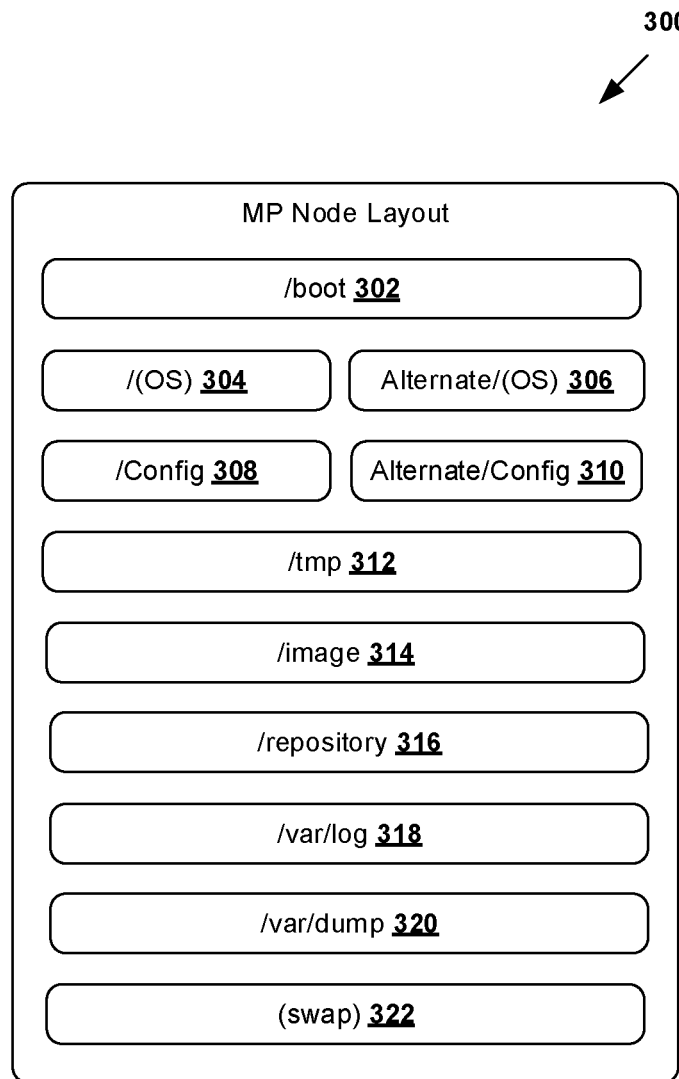
FIG. 3 is a schematic diagram illustrating an example layout of storage partitions of node in a management plane (MP) in the virtualized computing environment of FIG. 1.

FIG. 3 is a schematic diagram illustrating an example layout of storage partitions of a node 300 in a management plane (MP) in the virtualized computing environment 100 of FIG. 1. For instance, the node 300 may be the manager 151 (in the management plane MP-1 shown in FIG. 2 or the controller 161 in FIG. 1 in a CCP) that is to be upgraded.

According to one embodiment, the memory and/or disk of the node 300 may provide multiple partitions for various purposes. Such partitions may include a /boot partition 302, a /(OS) partition 304, an alternate/OS partition 306, a /config partition 308, an alternate/config partition 310, a /tmp partition 312, a /image partition 314, a /repository partition 316, a /var/log partition 318, a /var/dump partition 320, and a swap partition 322.

The /(OS) partition 304 may be a first partition that stores a pre-upgrade version of the OS, while the alternate/OS partition 306 may be a second partition that stores an upgraded version of the OS. For instance, during an upgrade, upgrade scripts may be executed so as to save copied operating system image, configuration files, and credentials to the /(OS) partition 304 of the to-be-upgraded node 300. The upgrade scripts may install a new operating system in the alternate/OS partition 306, and then reboot the to-be-upgraded node 300 from the alternate/OS partition 306; and/or reboot the to-be-upgraded node 300 from the first operating system partition (if rebooting in the alternate/OS partition 306 fails).

The /boot partition 302 may store a boot loader. The /config partition 308 may store current database and configuration files, while the alternate/config partition 310 may store database and configuration files for the upgrade. The /tmp partition 312 may store temporary files for the OS. The /image partition 314 may store image files from the upgrade bundle, while the /repository partition 316 stores pre-upgrade and upgrade bit versions. The /var/log partition 318 may store log data, and the /var/dump partition 320 may store core and heap dump data. The swap partition 322 may serve as overflow storage.

Figure 4:
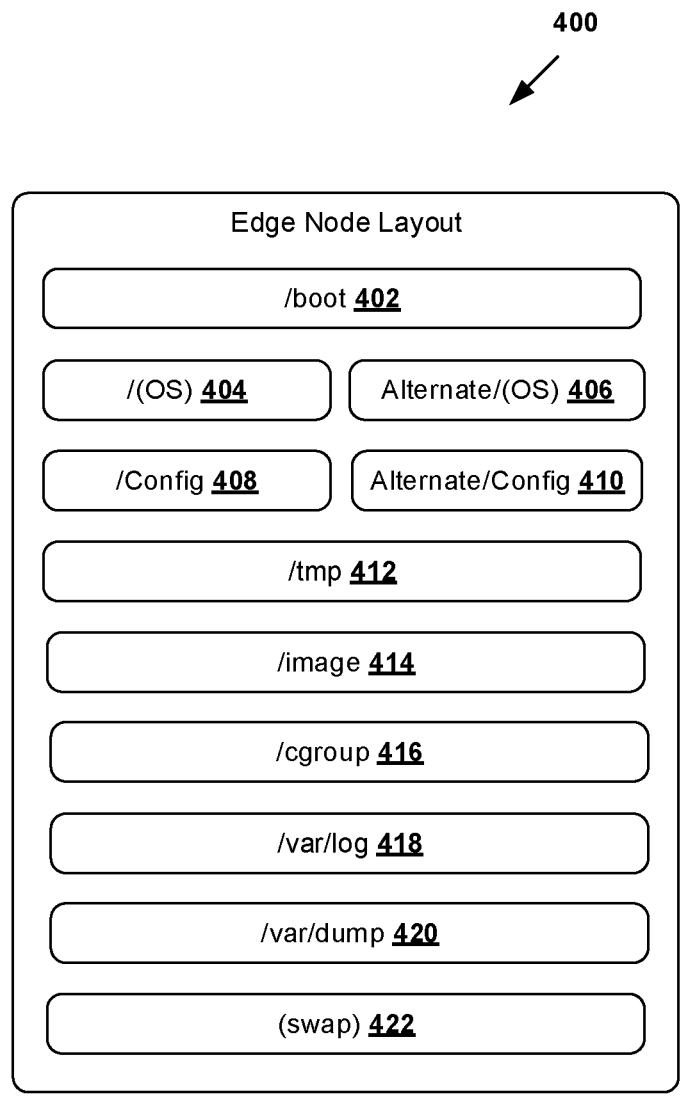
FIG. 4 is a schematic diagram illustrating an example layout of storage partitions of an edge node in the virtualized computing environment of FIG. 1.

FIG. 4 is a schematic diagram illustrating an example layout of storage partitions of an edge node 400 in the virtualized computing environment of FIG. 1. For instance, the node 400 may be the edge 171 (shown in FIGS. 1 and 2) that is to be upgraded. The layout sown in FIG. 4 may also be applicable to a host that is to be upgraded.

Similar to the node 300 of FIG. 3, the memory and/or disk of the node 400 may provide multiple partitions for various purposes. Such partitions may include a /boot partition 402, a /(OS) partition 404, an alternate/OS partition 406, a /config partition 408, an alternate/config partition 410, a /tmp partition 412, a /image partition 414, a /var/log partition 418, a /var/dump partition 420, and a swap partition 422. A /cgroup partition 418 may provide grouping information for VMs/ processes using common resources.

It is understood that the various partitions shown in FIGS. 3 and 4 are merely examples. Nodes may be configured with a greater or fewer number of partitions than those depicted, and may also be configured with other types of partitions. Also, the partitions shown and described herein may also be combined together in some embodiments, rather than being separate partitions. The role of at least some of these partitions in the upgrade and rollback processes will be described later below.

Figure 5:
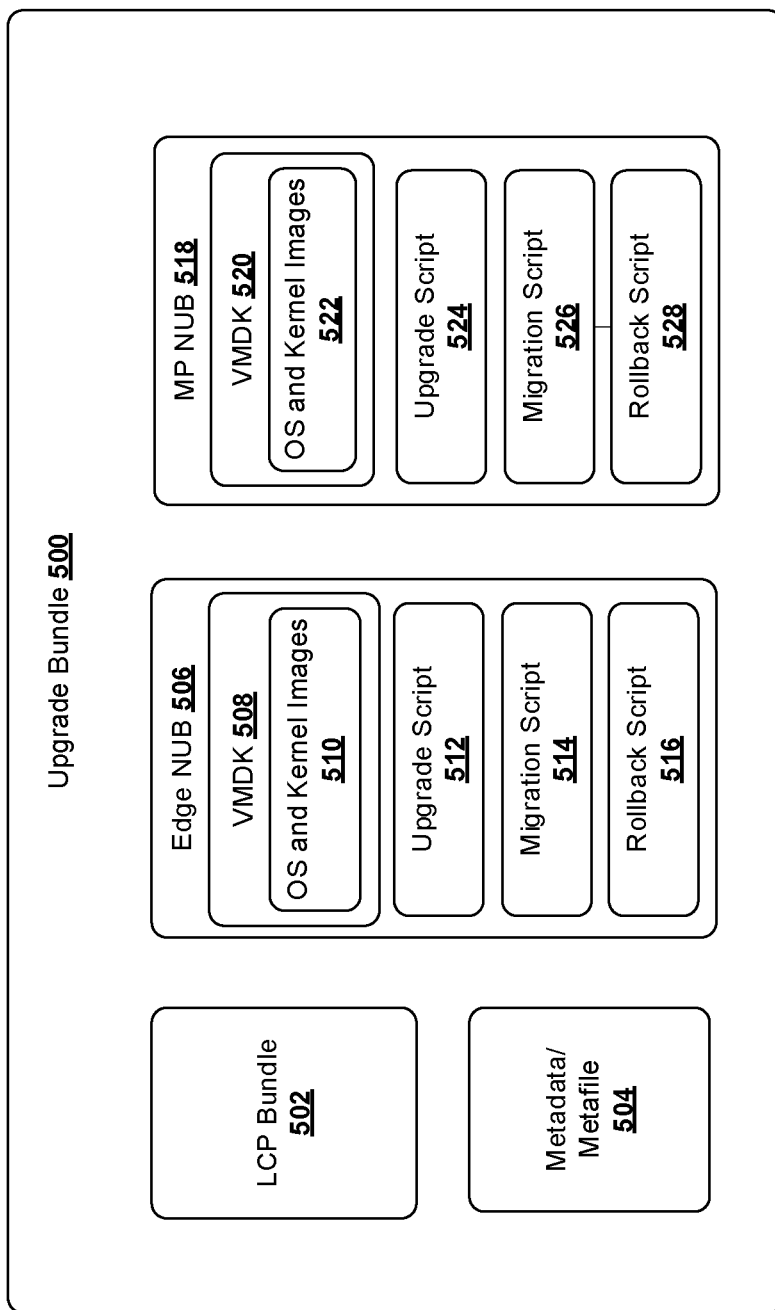
FIG. 5 is a schematic diagram illustrating an example upgrade bundle.

FIG. 5 is a schematic diagram illustrating an example upgrade bundle 500. The upgrade bundle 500 may provide one or more of the MP upgrade bundle 216, edge upgrade bundle 218, and host upgrade bundle 220 shown in FIG. 2, and may be stored in the repository 159.

The upgrade bundle 500 of various embodiments may be a signed image that an individual appliance (e.g., host, edge, or manager) gets from the upgrade coordinator 152 in order to perform their respective local upgrade. The upgrade bundle 500 is generated to include a local control plane (LCP) bundle 502 that contains host components, including virtual infrastructure bundles (VIBs), that are used to perform an upgrade of a host. The upgrade bundle 500 may further include metadata/metafile 504 that contains supported upgrade path information and package security information.

For an edge, an edge node upgrade bundle (NUB) 506 may include a virtual machine disk (VMDK) file 508 that has OS and kernel images 510 used for the node upgrade; upgrade script 512 to perform a local upgrade on the edge by executing upgrade operations; migration script 514 used for the migration of existing configuration, schema, database, and data from a source version to a target version; and rollback script 516 to rollback the edge node from the target version to the source version.

A script may generally refer to a sequence of instructions that can be interpreted or executed in a run-time environment. The upgrade script 512 may include a sequence of instructions related to the steps for orchestrating the upgrade process on a to-be-upgraded node. Analogously, the rollback script 516 may include a sequence of instructions related to the steps for performing a rollback of an upgraded node to a previous version.

For a management plane, management plane NUB 518 may include a VMDK file 520 that has OS and kernel images 522 used for the node upgrade; upgrade script 524 to perform a local upgrade on the manager by executing upgrade operations; migration script 526 used for the migration of existing configuration, schema, database, and data from a source version to a target version; and rollback script 528 to rollback the manager from the target version to the source version.

Rollback Process

Figure 6:
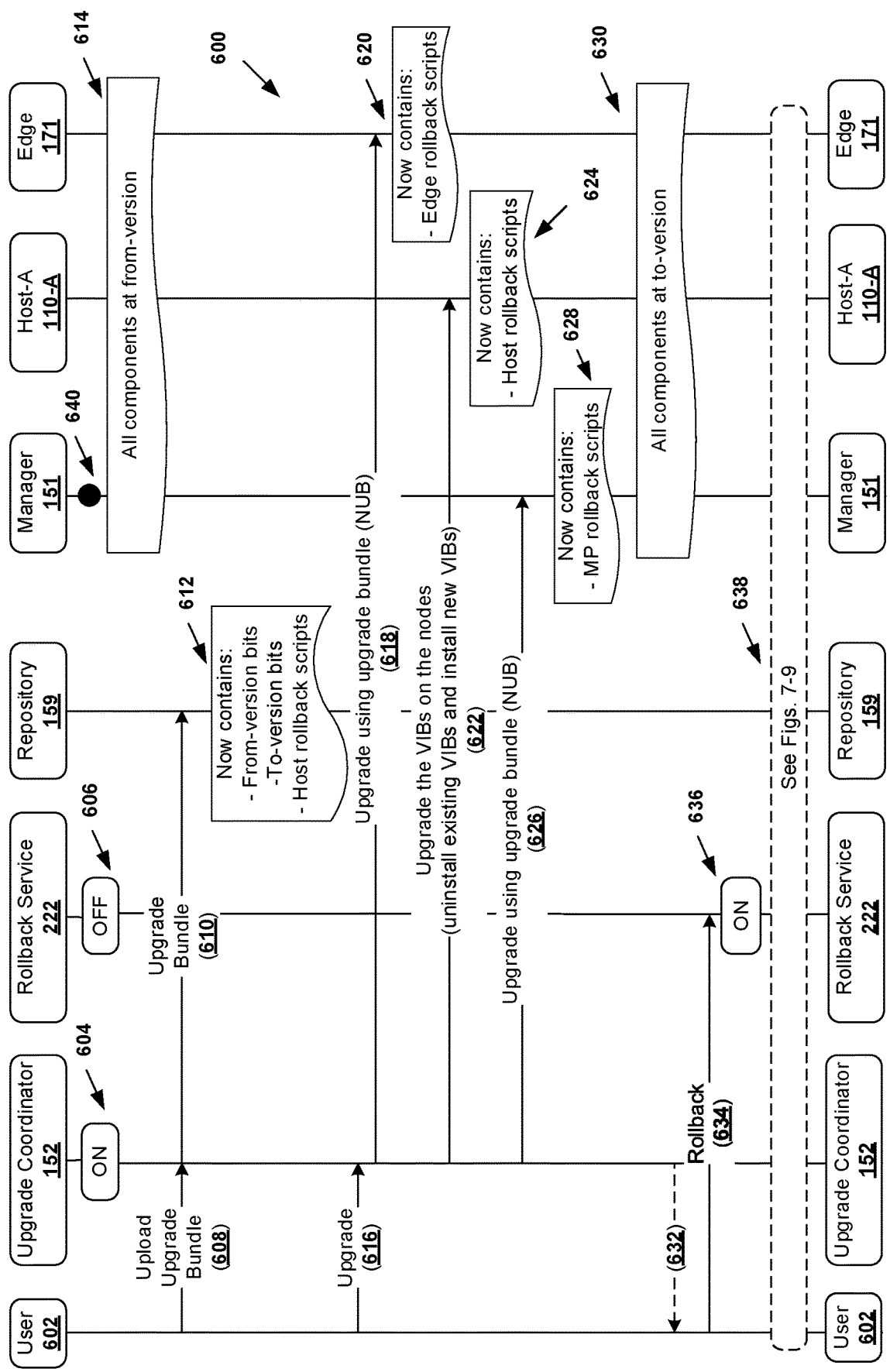
FIG. 6 is a sequence diagram illustrating an example method to perform a rollback in the virtualized computing environment of FIG. 1.

FIG. 6 is a sequence diagram illustrating an example method 600 to perform a rollback in the virtualized computing environment 100 of FIG. 1. The example method 600 may include one or more operations, functions, or actions such as those illustrated and described with reference to FIG. 6. The various operations, functions, or actions in FIG. 6 and in other methods/processes described herein may be combined into fewer operations, functions, or actions; divided into additional operations, functions, or actions; and/or eliminated depending on the desired implementation, and also performed in a different order than what is shown and described. In practice, the example process 600 may be performed by a management node (e.g., the manager 151 that includes the upgrade coordinator 152, the rollback service 222, and the repository 159) in the virtualized computing environment 100, in cooperation with a user 600, the host-A 110A, and the edge 171.

Initially in FIG. 6, the upgrade coordinator may be turned on at 604, and the rollback service 222 may be turned off at 606. The user 602 uploads (shown at 608) an upgrade bundle (e.g., the upgrade bundle 500) to the upgrade coordinator 152, which in turn stores (shown at 610) the upgrade bundle in the repository 159. At this point, the upgrade bundle contains (shown at 612) the from-version bits, the to-version bits, the rollback scripts (e.g., rollback scripts 516 and 518 and also host rollback scripts), and other contents such as shown in FIG. 5. Furthermore at this point, all components of the manager 151, host-A 110A, and edge 171 are at their from-version (e.g., pre-upgrade version), such as shown at 614.

The user 602 instructs (shown at 616) the upgrade coordinator 152 to initiate an upgrade. The upgrade coordinator 152 therefore cooperates with the upgrade agent 182 at the edge 171 to perform an upgrade (shown at 618) using the edge NUB 506. When the upgrade of the edge 171 is completed, the edge 171 may delete the upgrade scripts but still possess/contain the rollback scripts (shown at 620), in some embodiments.

Next, the upgrade coordinator 152 cooperates with the upgrade agent 181 at the host-A 110A to perform an upgrade (shown at 622) using an upgrade bundle for a host, such as the LCP bundle 502 and/or some other bundle. For example at 622, the upgrade coordinator 152 may upgrade virtual infrastructure bundles (VIBs) on the hosts, by uninstalling existing VIBs and installing new VIBs on these nodes. When the upgrade of the host-A 110A is completed, the host-A 110A may delete the upgrade scripts but still possess/contain the host rollback scripts (shown at 624), in some embodiments. Alternatively in other embodiments, the host rollback scripts do not reside at the host but instead reside at the repository 159 for later retrieval by a host in the event of a rollback.

Next, the upgrade coordinator 152 cooperates with the upgrade agent 210 at the manager 151 to perform an upgrade (shown at 626) using an upgrade bundle for a manager, such as the management plane NUB 518. When the upgrade of the manager 151 is completed, the manager 151 may delete the upgrade scripts but still possess/contain the rollback scripts (shown at 628), in some embodiments.

At this point, all components of the manager 151, host-A 110A, and edge 171 have been upgraded from their from-versions (e.g., pre-upgrade versions) to their to-versions, such as shown at 630. The upgrade coordinator 152 may report (shown at 632) the completion of the upgrade process to the user 602.

The user 602 may subsequently initiate (shown at 634) a rollback process, by activating the rollback service 222. FIG. 6 shows the rollback service 222 turned on at this point at 636. Rollbacks may be performed (shown at 638) for one or more of the manager 151, host-A 110A, and edge 171, which are indicated in FIG. 6 as being respectively depicted in FIGS. 7-9.

Figure 7:
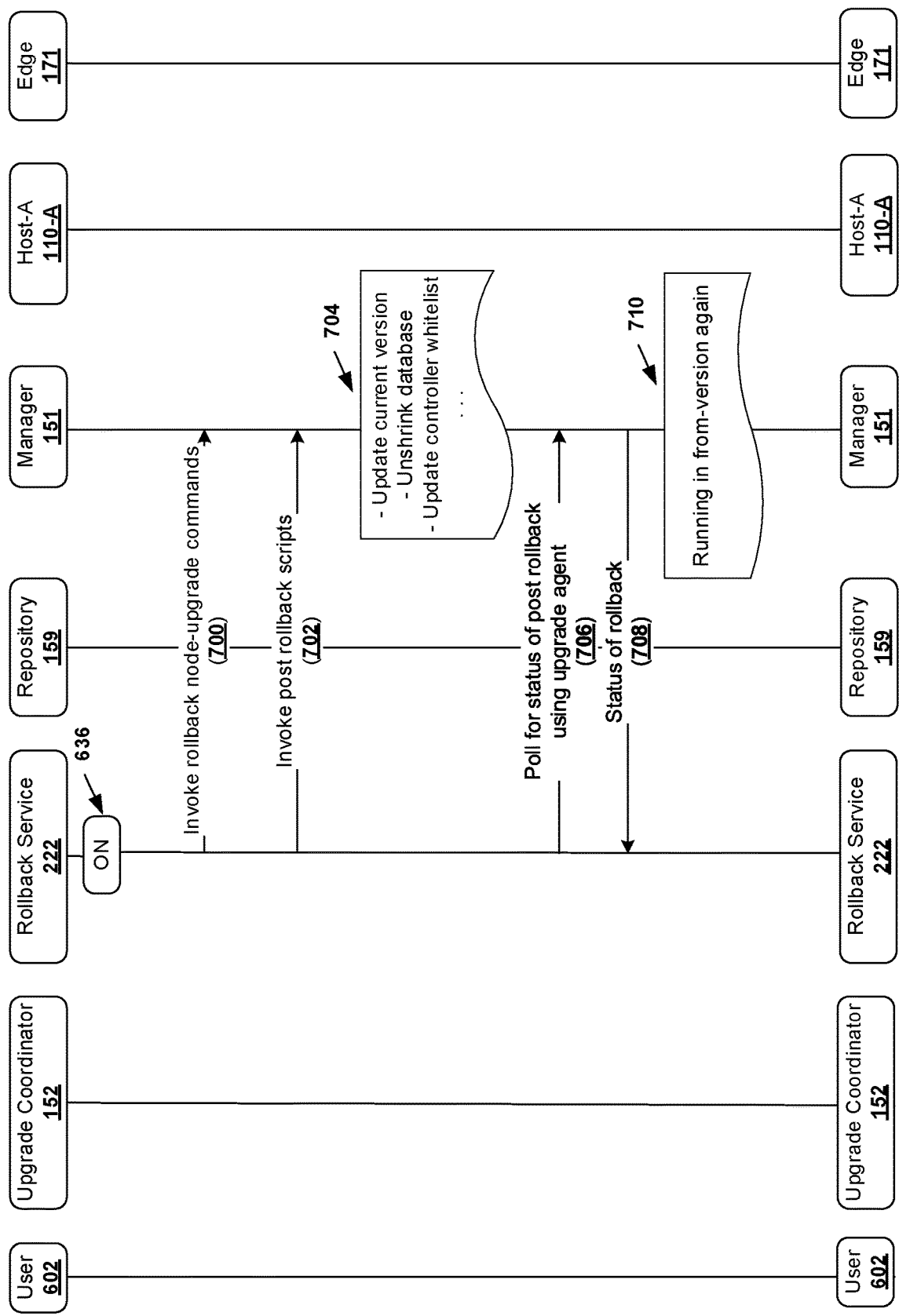
FIG. 7 is a sequence diagram illustrating a manager rollback that may be implemented by the method of FIG. 6.

FIG. 7 is a sequence diagram illustrating a manager rollback that may be implemented by the method 600 of FIG. 6. As stated, the rollback service 222 is started (shown at 636) on the orchestrator node (e.g., on the manager 151) in order to proceed with a rollback. The rollback service 222 initiates a rollback operation on this node by invoking (shown at 700) rollback node-upgrade commands through the upgrade coordinator 152 and the MP plugin 202, including having the upgrade coordinator 152 instruct the upgrade agent 210 to take the node into a quiescence mode wherein no writing request are allowed on the node. The rollback service 222 internally invokes the rollback script 528 (shown at 702) on the node.

The rollback script 528 that is invoked and executed on the node as part of the rollback process may be idempotent in some embodiments. Example steps in the rollback script 528 for the management plane may include the following in one embodiment:

1. Script1 executes the following commands to clean up the existing upgrade bundle on the node. If the upgrade bundle is not present on the node, script1 goes directly to step 2.
   a. "set debug-mode" (e.g., sets the node into a debug mode)
   b. "start upgrade-bundle <bundle-name> step finish_upgrade" (e.g., terminates the upgrade process)
2. Script1 runs the following commands to perform a rollback:
   a. "set debug-mode"
   b. "rollback node-upgrade" (e.g., initiates the rollback)
3. A reboot of the node is initiated as a part of step 2 above.
4. Script2 is initiated as a post-reboot operation.
5. Script2 updates the /repository/current version (stored in the /repository partition 316 in FIG. 3) to reflect the current version on the NSX.
6. Script2 unshrinks the database and configuration files (in the /config partition 308) post-rollback by calling a function to restore the pre-upgrade configuration.
7. Script2 updates a CCP whitelist to reflect the current acceptable NSX version.

The foregoing rollback script 528 switches the node's OS partitions such that the node boots from the old partition (e.g., the /OS partition 304). The rollback script 528 reboots the node, and step 5 onwards get executed to complete the rollback process. The orchestrator node (e.g., manager 151)

performs these steps for all of the manager nodes in the cluster so as to ensure that the cluster status is updated and running before proceeding to perform a host rollback.

According to some embodiments, the rollback service 222 polls (shown at 706) the upgrade agent 210 for status/progress of the rollback. The upgrade agent 210 in turn reports status and progress (shown at 708) back to the rollback service 222 during and post rollback, for presentation to the user 602 via a user interface. When the rollback is completed, the manager 151 will be running in the from-version again (shown at 710).

Figure 8:
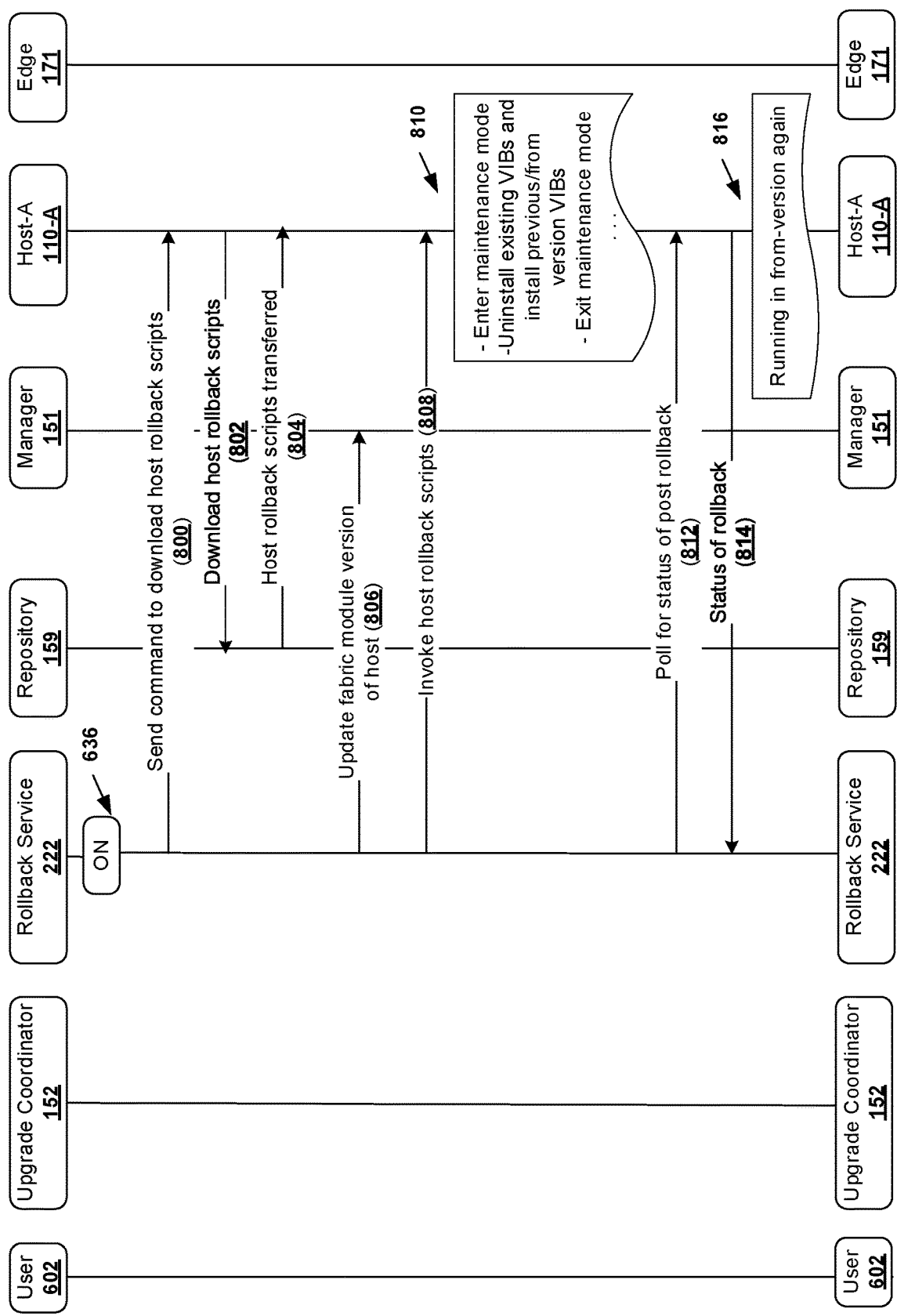
FIG. 8 is a sequence diagram illustrating a host rollback that may be implemented by the method of FIG. 6.

FIG. 8 is a sequence diagram illustrating a host rollback that may be implemented by the method 600 of FIG. 6 for the host-A 110A, after the manager rollback of FIG. 7 is completed. A host rollback may be initiated by the rollback service 222 through the fabric framework 212 by sending a command (shown at 800) to the upgrade agent 181 (locally installed at the host-A 110A) to download the host rollback scripts.

The upgrade agent 181 contacts (shown at 802) the repository 159 to download the rollback scripts, and the rollback scripts are transferred (shown at 804) to the upgrade agent 181. The rollback service 222 updates (shown at 806) the fabric module version at the manager 151 so as to allow communication with the old version bits of the data plane, and then invokes (shown at 808) the rollback scripts for execution by the upgrade agent 181 at the host-A 110A.

The host rollback script may perform the following steps to rollback a host, in one embodiment:
1. GET api/v1/fabric/modules (e.g., returns a list of fabric modules)
2. Identify the fabric module for 'hostprep' from the above list, and note its 'id'
3. GET api/v1/fabric/modules/<id> (e.g., returns the deployment specification list 'from' and 'to')
4. Note the versions for the 'from' and 'to' deployment specification
5. Change the response body so that current_version field equals 'from' version instead of 'to' version (Obtained in step 4) and invoke PUT api/v1/fabric/modules/<id>
6. For each host:
    a. Put the host into maintenance mode, SSH to the host and run nsxcli -c 'del nsx'.
    b. Execute Resolve Host API on each host.

The foregoing rollback steps of the host rollback script are shown at 810 in FIG. 8, which may involve the host entering the maintenance mode, then existing VIBs being uninstalled and previous/from version VIBs being installed, and then the host exiting the maintenance mode. The rollback script internally replaces new vibs (e.g., installation bundles) with old vibs, and performs the steps of the host rollback script. The rollback script gets executed to enable the host to get up and running with old bits, and to communicate with other components. Once the old version bits are up and running, the data plane connects back to the management plane.

The rollback service 222 polls (shown at 812) the upgrade agent 181 for status of the rollback. The upgrade agent 181 in turn reports status and progress (shown at 814) back to the rollback service 222 during and post rollback, for presentation to the user 602 via a user interface. When the rollback is completed, the host-A 110A will be running in the from-version again (shown at 816).

Figure 9:
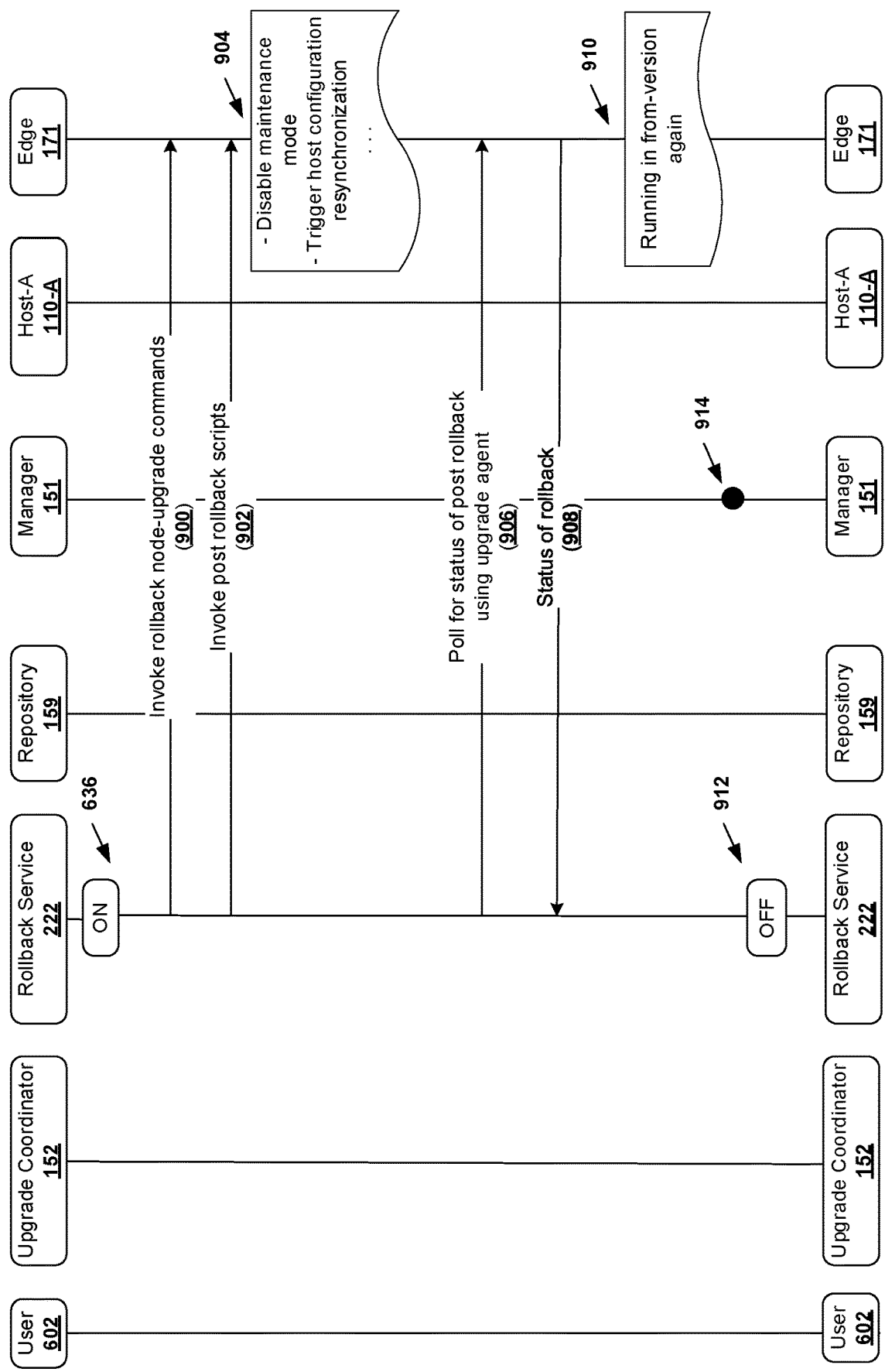
FIG. 9 is a sequence diagram illustrating an edge rollback that may be implemented by the method of FIG. 6.

FIG. 9 is a sequence diagram illustrating an edge rollback that may be implemented by the method 600 of FIG. 6. An edge rollback may be triggered by the completion of the host rollback of FIG. 8.

The rollback service 222 initiates an edge rollback operation on this node by invoking (shown at 900) rollback node-upgrade commands through the upgrade coordinator 152 and the edge plugin 204, including having the upgrade coordinator 152 instruct the upgrade agent 182 to take the node into a quiescence mode wherein no writing request are allowed on the node. The rollback service 222 internally invokes the rollback script 516 (shown at 902) on the node.

Example steps in the rollback script 516 for the edge 171 may include the following in one embodiment:
1. Script1 executes the following commands to clean up the existing upgrade bundle on the node. If the upgrade bundle is not present on the node, script1 goes directly to step 2.
    a. "set debug-mode" (e.g., sets the node into a debug mode)
    b. "start upgrade-bundle <bundle-name> step finish_upgrade" (e.g., terminates the upgrade process)
2. Script1 executes the following commands to perform a rollback:
    a. "set debug-mode"
    b. "rollback node-upgrade" (e.g., initiates the rollback)
3. A reboot of the node is initiated as a part of step 2 above.
4. Script2 is initiated as a post-reboot operation.
5. Script2 executes the following commands:
    a. "set debug-mode"
    b. "set maintenance-mode disabled" (e.g., disables the maintenance mode at the node)
6. Script2 updates the edge whitelist to reflect the current acceptable NSX version.
7. Script2 executes a host configuration resynchronization by calling the following API:
POST https://<nsx-mgr>/api/v1/transport-nodes/<tn-id>?action=resync_host_config The foregoing rollback script 516 switches the node's OS partitions such that the node boots from the old partition (e.g., the /OS partition 404). The rollback script 516 reboots the node, and step 5 onwards get executed to complete the rollback process.

The rollback service 222 polls (shown at 906) the upgrade agent 182 for status of the rollback. The upgrade agent 182 in turn reports status and progress (shown at 908) back to the rollback service 222 during and post rollback, for presentation to the user 602 via a user interface. When the rollback is completed, the edge 171 will be running in the from-version again (shown at 910). The rollback service 222 may then be turned off at 912.

Data and Configuration Validation and Integrity Checking

According to some embodiments, the upgrade coordinator 152 is provided with a post-rollback capability to perform data and configuration validation and integrity checking. This capability provides a user with a degree of confidence that all the data and configuration post-rollback are intact.

The post-rollback data and configuration checking for integrity/validation addresses at least the following issues:
1. Rollbacks performed for some virtualized computing environments that do not check the data integrity;
2. Rollbacks performed for some virtualized computing environments that do not check configuration integrity; and
3. Data plane rollbacks for some virtualized computing environments perform existing package replacement with new packages, and restart the required services.

Figure 10:
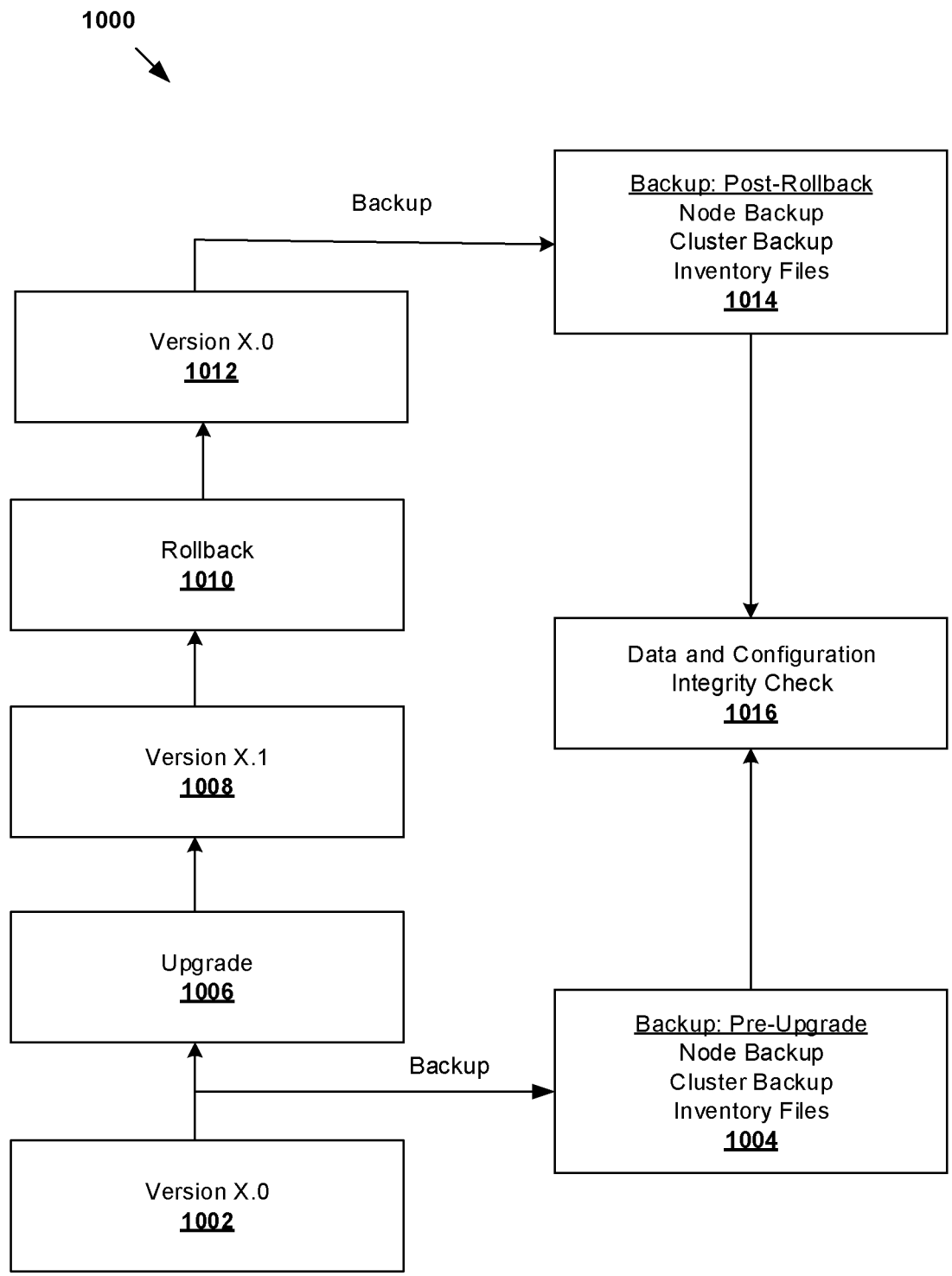
FIG. 10 is a flow diagram illustrating a data and configuration integrity checking method that can be performed post-rollback.

FIG. 10 is a flow diagram illustrating a data and configuration integrity checking method 1000 that can be performed post-rollback. The method 1000 may combine elements of the rollback methods described above along with operations that pertain to integrity checking/validation.

The method 1000 may start at a block 1002, wherein the currently installed/running version of the components in the logical overlay network (e.g., managers, hosts, edges, and clusters thereof) is "version X.0" as an example. Next, when an upgrade bundle is uploaded to the upgrade coordinator 152 and is scheduled for installation, a backup of the current version X.0 is performed at a block 1004.

Instructing the generation of the backup at the block 1040 may be an option selected by a user or may be an automatic part of a rollback process. In some embodiments, the checking may be performed only when the user explicitly selects the option of the validity checking—else, the validity checking is disabled as a default.

According to various embodiments, the backup performed at the block 1004 involves making backup copies of the node(s), cluster(s), and inventory files as part of the upgrade process performed by the upgrade coordinator 152. The backup copies may be stored at the repository 159 or other suitable storage locations.

The backup performed at the block 1004 in some embodiments may be a mandatory pre-check that has to be performed before the user is allowed to continue the upgrade. This pre-check will fail if the backup is not performed at the block 1004, and so will be prevented from allowing the upgrade to proceed.

After successful completion of the backup at the block 1004, the upgrade is performed at a block 1006, so as to upgrade from version X.0 to version X.1. The upgrade operations performed at the block 1006 may be similar to the upgrade operations described above with respect to the method 600 of FIG. 6. For instance, the upgrade coordinator 152 itself may be upgraded if new upgrade functionality is available for the upgrade coordinator 152, as well as upgrading the edge(s), host(s), and manager(s). The upgrade to version X.1 is completed at a block 1008.

After completion of the upgrade, the user instructs a rollback at a block 1010. This request/instruction for a rollback triggers another backup after the rollback service 222 is started, if the user has selected the data and configuration integrity checking option. The rollback is performed and completed for the manager(s), host(s), and edge(s) at the block 1010, such as by performing the processes described above in FIGS. 7-9. The result of the rollback is a return to version X.0 at a block 1012.

At a block 1014, the post-rollback backup copies are generated and stored after completion of the rollback process at the block 1012, including backups of node(s), cluster(s), and inventory files. At a block 1016, the rollback service 222 calls a configuration and data integrity checking module to validate the results of the rollback. According to various embodiments, this integrity checking module may be part of the upgrade coordinator 152 (and/or other component), and is configured to locate both (a) post-rollback backup data and configuration files and (b) pre-upgrade backup data and configuration files, and to compare the data and configuration files from both the backups to determine if there are any discrepancies. The comparison may involve looking for matching between the two backups, and integrity may be validated (for example) if the amount of matching between the two backups meets a threshold level of confidence. The threshold level of confidence may be, for instance, within a range of 100%-80% matching of lines between the two backups.

In some embodiments, if the threshold level of matching is not met when the two backups are compared, the integrity check module may send an alert to a user (such as a system administrator) that requested the upgrade/rollback, so that the differences between the two backups can be further investigated.

The pre-upgrade backup performed at the block 1004 described above is shown at a point 640 in FIG. 6. Such pre-upgrade backup at 640 is depicted in FIG. 6 as being initiated/performed/controlled by the manager 151, specifically the upgrade coordinator 152 or some other component of the manager 151. The post-rollback backup performed at the block 1014 described above is shown at a point 914 in FIG. 9. Such post-rollback backup at 914 is also depicted in FIG. 9 as being initiated/performed/controlled by the manager 151, and is performed after the edge has completed its rollback.

For data integrity verification according to various embodiments, there may be six files/folders that form the backups: an inventory backup file, a node backup, and four cluster backups (e.g., controller, manager, policy manager, etc.). The inventory backup file stores the logical entities created in the manager (e.g., fabric nodes, fabric edge nodes, logical switches, logical routers, transport zone, transport nodes, host switch profile, etc.). This inventory file also maintains the data specific to each node such as IP address, OS type, OS version, parent, node ID, version, fully qualified domain name (FQDN), display name, create time, and user. Thus, the integrity checking module can compare (at the block 1016) the inventory backup file before the upgrade and after the rollback to determine data integrity.

Various approaches may be used by the embodiments for integrity validation. When a backup is available from a pre-upgrade and after a rollback, new data is collected. Techniques may be applied to these backups so as to quickly infer and pinpoint the area(s) of focus where more effort may be needed to ascertain the integrity.

Figure 11:
FIG. 11 provides a table and diagram illustrating identification of unmatched lines between backup files.
Figure 11:
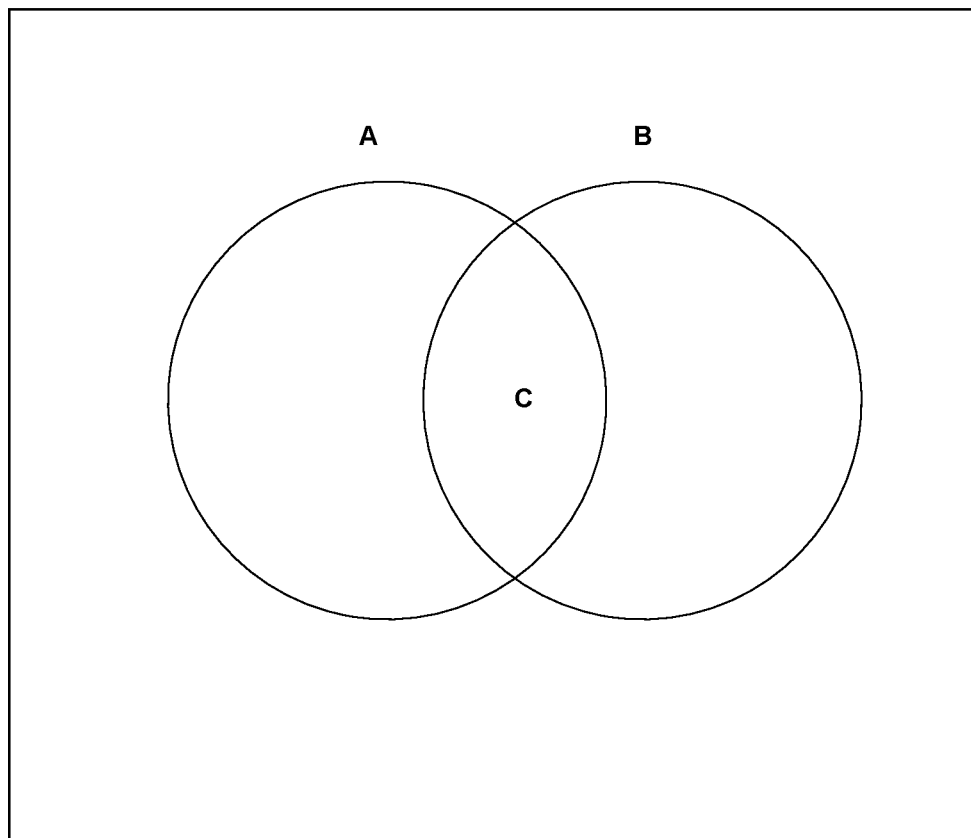

For example, if in an environment, various files are collected and compared with fresh backup files, and based on lines that are matched or are unmatched, a table 1100 in FIG. 11 is generated. Specifically, FIG. 11 shows that the table includes a column 1102 for file names of backup files, a column 1104 for matching lines between the backup files, a column 1106 for lines in a older backup that are unmatched, a column 1108 for new lines in the newer backup that are unmatched with the older backup, and a column 1110 for general comments.

From the table 1100 in FIG. 11, it may be intuitive to check why there are unmatched lines and then verification can be focused only on those unmatched areas/lines. When large output data is generated, or configurations are very verbose, this approach drastically reduces the total effort needed to perform validation.

The logic behind the foregoing quick validation is based upon a basic set operation: an intersection of two sets. That is, all the lines in an existing backup file are converted into a separate set element and collected into a set-object A, such as shown in a diagram 1112 in FIG. 11. Then all of the lines from the other backup file are collected into another set B. When an intersection operation is applied to these two sets A and B, following combinations result:

1. If A and B have all lines in common, then their data matched exactly, and therefore data and configuration integrity us achieved.
2. If A has some lines which do not match with any of lines in B, such a situation is A-(A∩B) or A-C in the diagram 1112, in which old data did not match with new data, then such a result needs further investigation/validation in order to fine the reason(s) for the differences.

3. If B has some lines which do not match with any of the lines in A, it is B-(A∩B) or B-C in the diagram 1112, in which new data did not match with old data, then such a result suggests that new features, data, schema changes got introduced, and should be further investigated.

Figure 12:
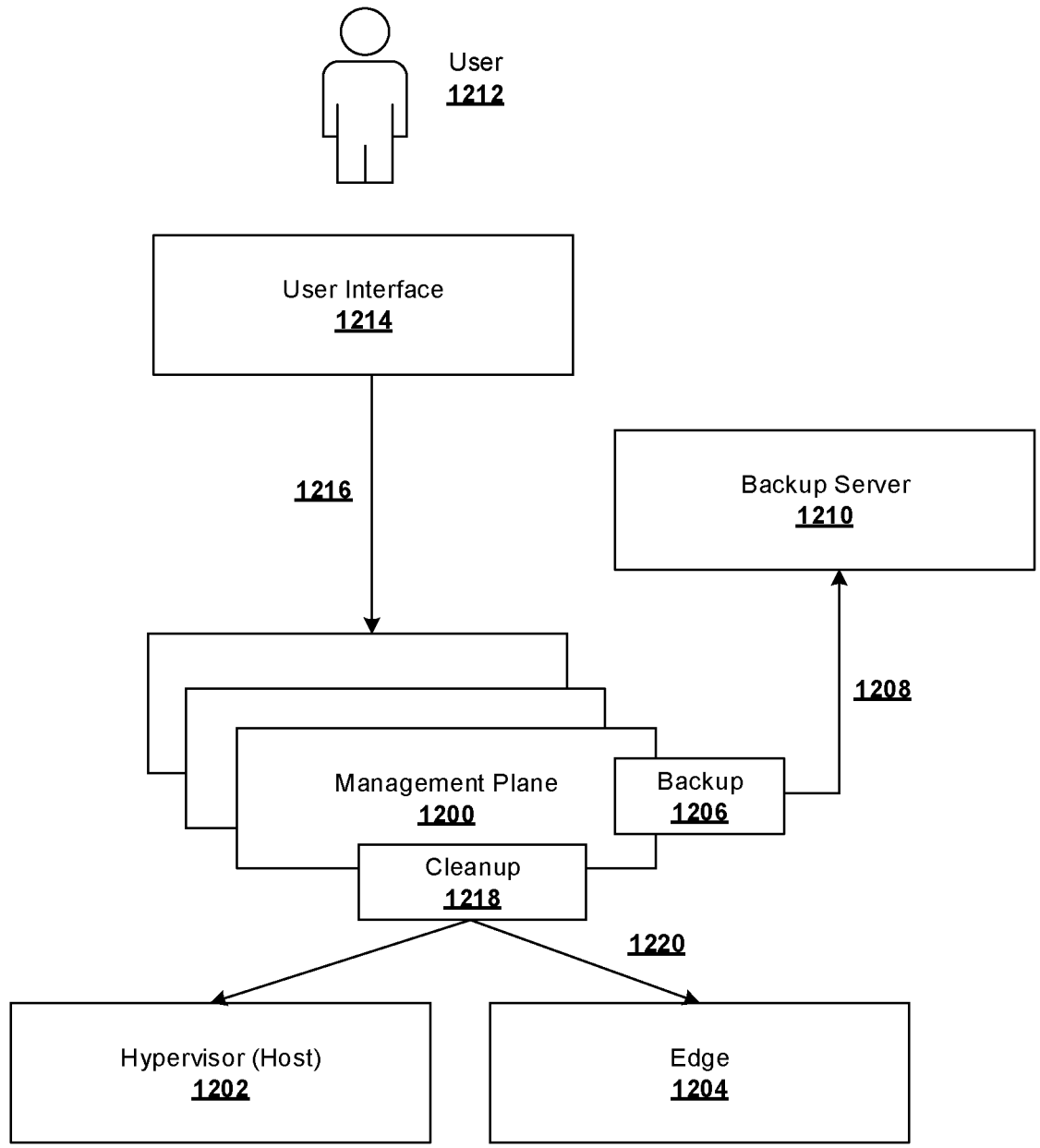
FIG. 12 is a schematic diagram of components in a virtualized computing environment that may cooperate to perform data and configuration checking/validation.

FIG. 12 is a schematic diagram 1200 of components in a virtualized computing environment of FIG. 1 that may cooperate to perform data and configuration checking/validation, including a management plane 1200 that includes a manager (e.g., the manager 151 previously described), a host 1202 having a hypervisor (e.g., the host-A 110A previously described), and an edge 1204 (e.g., the edge 171 previously described).

The management plane 1200 uses a backup utility 1206 (such as the upgrade coordinator 152) to store backup files at and to retrieve backup files from (shown at 1208) a backup server 1210. The backup server 1210 of some embodiments may be an FTP or SFTP location that is involved in the backup process, such as a node-level (appliance management) backup, a cluster-level (MP, policy, CCP, etc.) backup, and/or an inventory backup. The resultant backup files in the backup server 1210 may be managed separately.

One advantage of this separation is that a user 1212 can make node-level backups of more than one manager, and later at restore time, make a decision as to which IP address to use for the first manager node in the cluster. A second advantage of this separation is that because the cluster-level backup does not include the node-level configuration, the same cluster-level backup file can be used to restore the manager cluster to a previous cluster-level checkpoint. The backup file stores the system data available at the instance of making the backup.

FIG. 12 also shows that the user 1212 can operate a user interface 1214 (such as a graphical user interface) to initiate various operations, such as configuring periodic backup, requesting a one-time backup, tracking rollback and validation, reviewing validation results, etc. (all collectively shown at 1216). The user 1212 can further operate a cleanup utility 1218 at the management plane 1200 to perform cleanup of files in the edge 1204 and the host 1202 (shown at 1220), such as via communications sent along a synchronous transport node.

The rollback techniques described herein thus provide an automated way to perform a rollback of a cluster of appliances (e.g., MP, CCP, and edge nodes) and a large number of workload hosts managed by a manager (e.g., a management server). Systems that implement such rollback capabilities are able to carry out generic as well as specific tasks, and are fault tolerant and able to handle failovers. Furthermore, maintenance windows can be reduced and faster rollbacks may be provided, and the rollback techniques are scalable so as to be able to perform massive rollbacks. Also, each component in a logical overlay network can be capable of being rolled back, and progress and status reporting of the rollback activities can be provided. The integrity of the data and configuration can be verified/validated, so as to confirm that the rollback is successful.

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 12. For example, the computer system may implement processes performed by managers 151/153, controllers 161/163, edges 171/173, hosts 110A/110B, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those of ordinary skill in the art that each function and/or operation within such block diagrams, flowcharts, or examples can be implemented, individually and/or collectively, by a wide range of hardware, software, firmware, or any combination thereof.

Those of ordinary skill in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the capabilities of one of ordinary skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those of ordinary skill in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to perform a rollback in a virtualized computing environment having an edge, a host, and a manager, the method comprising:

generating an upgrade bundle to include a rollback script in addition to an upgrade script;

after completion of an upgrade, from a first version to a second version, of the edge, the host, and the manager using the upgrade script and in accordance with an upgrade order, initiating the rollback to return the edge, the host, and the manager from the second version to the first version; and executing the rollback script to perform and complete the rollback, wherein the rollback is performed in accordance with a rollback order that is a reverse of the upgrade order.

2. The method of claim 1, further comprising:

polling each of the manager, the host, and the edge for a status of the rollback; and.

receiving the status of the rollback from each of the manager, the host, and the edge.

3. The method of claim 1, wherein:

the upgrade order is the edge first, the host next, and the manager last; and the rollback order is the manager first, the host next, and the edge last.

4. The method of claim 1, wherein the upgrade script is deleted after the upgrade is completed, and wherein the rollback script remains after the upgrade is completed.

5. The method of claim 1, wherein:

the rollback script resides at the edge and at the manager, after the completion of the upgrade of the edge and the manager; and the rollback script resides remotely from the host and is absent at the host, after the completion of the upgrade of the host.

6. The method of claim 1, wherein initiating the rollback includes placing at least one of the manager, the host, and the edge into a quiescent mode before completing their respective rollback.

7. The method of claim 1, wherein executing the rollback script includes restoring configuration files and data, corresponding to the first version, from a first storage partition amongst first and second storage partitions, and wherein the second storage partition stores configuration files and data corresponding to the second version.

8. A non-transitory computer-readable storage medium that includes instructions which, in response to execution by a processor, cause the processor to implement a method to perform a rollback in a virtualized computing environment having an edge, a host, and a manager, wherein the method comprises:

generating an upgrade bundle to include a rollback script in addition to an upgrade script;

after completion of an upgrade, from a first version to a second version, of the edge, the host, and the manager using the upgrade script and in accordance with an upgrade order, initiating the rollback to return the edge, the host, and the manager from the second version to the first version; and executing the rollback script to perform and complete the rollback, wherein the rollback is performed in accordance with a rollback order that is a reverse of the upgrade order.

9. The non-transitory computer-readable storage medium of claim 8, wherein the method further comprises:

polling each of the manager, the host, and the edge for a status of the rollback; and.

receiving the status of the rollback from each of the manager, the host, and the edge.

10. The non-transitory computer-readable storage medium of claim 8, wherein:

the upgrade order is the edge first, the host next, and the manager last; and the rollback order is the manager first, the host next, and the edge last.

11. The non-transitory computer-readable storage medium of claim 8, wherein the upgrade script is deleted after the upgrade is completed, and wherein the rollback script remains after the upgrade is completed.

12. The non-transitory computer-readable storage medium of claim 8, wherein:

the rollback script resides at the edge and at the manager, after the completion of the upgrade of the edge and the manager; and the rollback script resides remotely from the host and is absent at the host, after the completion of the upgrade of the host.

13. The non-transitory computer-readable storage medium of claim 8, wherein initiating the rollback includes placing at least one of the manager, the host, and the edge into a quiescent mode before completing their respective rollback.

14. The non-transitory computer-readable storage medium of claim 8, wherein executing the rollback script includes restoring configuration files and data, corresponding to the first version, from a first storage partition amongst first and second storage partitions, and wherein the second storage partition stores configuration files and data corresponding to the second version.

15. A computer system, comprising:

a processor; and a non-transitory computer-readable storage medium coupled to the processor and that includes instructions which, in response to execution by the processor, cause the processor to perform operations for a rollback in a virtualized computing environment having an edge, a host, and a manager, wherein the operations comprise:

generate an upgrade bundle to include a rollback script in addition to an upgrade script;

after completion of an upgrade, from a first version to a second version, of the edge, the host, and the manager using the upgrade script and in accordance with an upgrade order, initiate the rollback to return the edge, the host, and the manager from the second version to the first version; and execute the rollback script to perform and complete the rollback, wherein the rollback is performed in accordance with a rollback order that is a reverse of the upgrade order.

16. The computer system of claim 15, wherein the operations further comprise:

poll each of the manager, the host, and the edge for a status of the rollback; and.

receive the status of the rollback from each of the manager, the host, and the edge.

17. The computer system of claim 15, wherein:

the upgrade order is the edge first, the host next, and the manager last; and the rollback order is the manager first, the host next, and the edge last.

18. The computer system of claim 15, wherein the upgrade script is deleted after the upgrade is completed, and wherein the rollback script remains after the upgrade is completed.

19. The computer system of claim 15, wherein:
the rollback script resides at the edge and at the manager, after the completion of the upgrade of the edge and the manager; and
the rollback script resides remotely from the host and is absent at the host, after the completion of the upgrade of the host.

20. The computer system of claim 15, wherein the operations to initiate the rollback includes operations that comprise:
place at least one of the manager, the host, and the edge into a quiescent mode before completing their respective rollback.

21. The computer system of claim 15, wherein the operations to execute the rollback script includes operations that comprise:
restore configuration files and data, corresponding to the first version, from a first storage partition amongst first and second storage partitions, and wherein the second storage partition stores configuration files and data corresponding to the second version.

\* \* \* \* \*